United States Patent [19]

Meinecke et al.

[11] Patent Number: 4,880,532
[45] Date of Patent: Nov. 14, 1989

[54] SORTING APPARATUS FOR FIBER SUSPENSIONS

[75] Inventors: Albrecht Meinecke; Walter Musselmann, both of Heidenheim, Fed. Rep. of Germany

[73] Assignee: J. M. Voith GmbH, Heidenheim, Fed. Rep. of Germany

[21] Appl. No.: 15,214

[22] Filed: Feb. 17, 1987

[30] Foreign Application Priority Data

Feb. 18, 1986 [DE] Fed. Rep. of Germany ....... 3605078

[51] Int. Cl.[4] .............................................. D21D 5/06
[52] U.S. Cl. .................................... 209/268; 209/273
[58] Field of Search ............... 209/273, 268, 262, 240; 210/398

[56] References Cited

U.S. PATENT DOCUMENTS 4,202,759 5/1980 Krolopp et al. .................... 209/273

FOREIGN PATENT DOCUMENTS 3238742 4/1984 Fed. Rep. of Germany ...... 209/273
0032594 8/1984 Japan .................................. 209/273

Primary Examiner—Joseph F. Peters, Jr.
Assistant Examiner—Edwin L. Swinehart
Attorney, Agent, or Firm—Albert L. Jeffers; Richard L. Robinson

[57] ABSTRACT

A sorting apparatus has a first casing section (1) with a larger diameter and a second casing section (2) with a relatively smaller diameter, which casing sections are generally aligned in series. A rotor (6) has rotor parts which are coordinated with each casing section and appropriately adapted. An impeller rotates in a churning space (5) of the first casing section (1) and a drum type rotor section (9) in the second casing section (2) supports sorting elements (16), which rotate in a strainer space (12) formed by a cylindrical strainer basket (11). This provides both despeckling and sorting in the machine, and separates the rejects with a high solid content.

28 Claims, 5 Drawing Sheets

SORTING APPARATUS FOR FIBER SUSPENSIONS

The invention concerns a sorting apparatus for fiber suspensions. Sorting apparatus are disclosed in U.S. Pat. No. 3,898,157. This sorter was not developed as a final stage sorter because diluting water is added at the end of the second sorting zone and a very narrow discharge cross section exists there. Thus the rejects do not leave the strainer zone at a high consistency. Moreover, it follows from the description that the concern is to enable a high rate of production. Additionally, it is stated that specks or knots specifically are to be removed from the fiber suspension, which is indicative of the fact that, in relation to the heavily contaminated suspension accruing in the final stage, a relatively lightly contaminated fiber suspension is on hand here.

The machine employed in the final stage of a sorting (for instance sorting of waste paper) serves to separate interfering substances (rejects) from the usable fiber material. This separation process must operate to minimize fiber loss and to maintain rejects separation as high as possible. The final sorting stage determines the efficiency of the entire sorting process.

Prior final stage sorters, such as a vibratory sorter, require strainer perforations with relatively large strainer surfaces and high fraction dilutions in order to achieve any reasonably satisfactory sorting effect. Additionally, the strainers are very susceptible to clogging.

Therefore, final stage sorters have been developed in recent years to replace vibratory sorters, which final stage sorters have a high dry rejects content, as described in the German Patent Publication No. 30 06 482 (corresponding to U.S. Pat. No. 4,356,085), for example. However, this machine is limited to only medium purity requirements and has a relatively high energy consumption for strictly sorting purposes.

Another final stage sorter is the rejects sorter disclosed in the German Patent Publication No. 32 38 742. This machine is strictly a sorter, that is paper specks, which are insufficiently beaten are frequently contained in the waste fraction. This apparatus uses tightly (small) perforated sorting strainers which have a high energy consumption, and the material loss is frequently large.

The underlying problem is to provide a sorting apparatus which separates the rejects in the final stage and maintains the fiber loss as low as possible in a continuous operation, while also continuously removing the light contaminants and achieving a high rejects consistency.

SUMMARY OF THE INVENTION

The present invention provides a continuously operating sorting apparatus for final stage separation of rejects, which apparatus maintains a low fiber loss, continuously removes contaminants and has a high rejects consistency.

BRIEF DESCRIPTION OF THE DRAWINGS

In the figures of the drawing like reference numerals identify like components, and in the drawings.

DETAILED DESCRIPTION OF THE INVENTION

Figure 1:
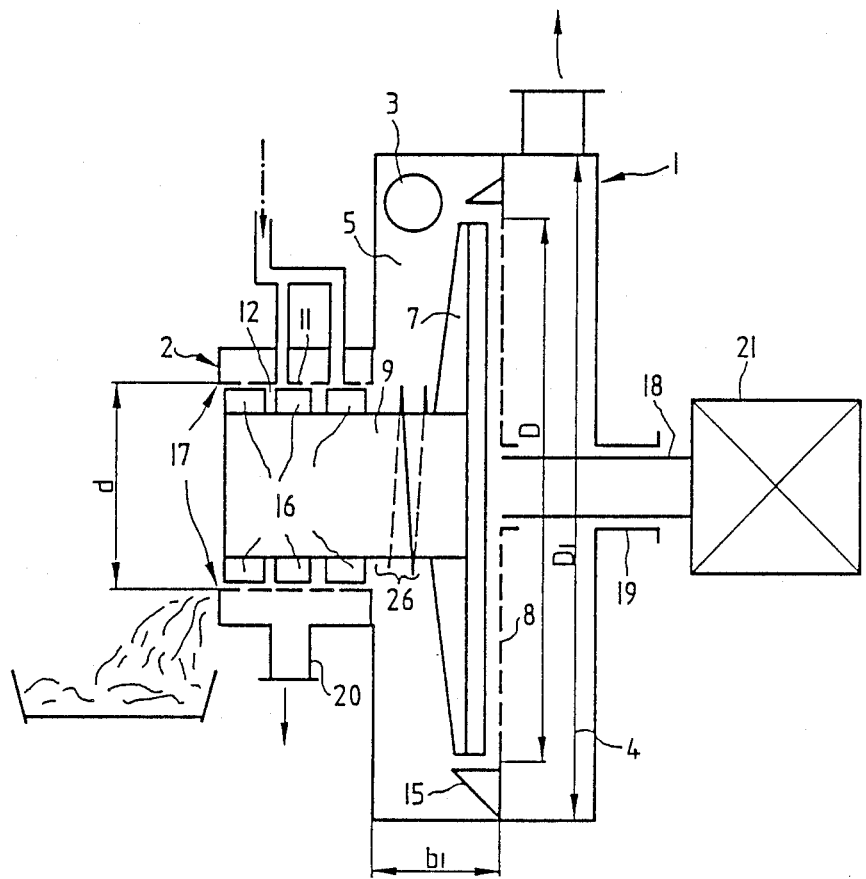
FIG. 1 is a schematic illustration of the sorter apparatus in a horizontal arrangement.

The invention will be explained hereafter with the aid of embodiments illustrated in the figures, where the figures show basically longitudinal sections of the machines while the pertaining figures indexed 'a' always depict a cross section of the corresponding presentation in longitudinal section.

The German Patent Publication No. 30 10 952, described a sorting apparatus rotor component, similar to the rotor in the first casing section 1 with the larger diameter. But the present invention is not limited to these details. The rotor part used in the second casing section 2 with the smaller diameter is similar to the one shown in the German Patent Publication No. 29 30 475 (corresponding to U.S. Pat. No. 4,351,728). Other details are taught in the previously cited German Patent Publication No. 30 06 482 (corresponding to U.S. Pat. No. 4,356,085). Details of the rotor are indicated in the following disclosure.

The sorting apparatus has a casing which is essentially cylindrical and a first casing section 1 with a relatively large diameter D and a second casing section 2 with a relatively small diameter d. The ratio of the casing diameters or strainer diameters, respectively, is $D/d = 1.5$ to 4. The radial pressure gradient in casing section 1 is utilized and the practical embodiments tend more toward the higher ratio values. Intake 3 to the sorting apparatus is essentially tangential at the circumference of casing section 1 and into a first strainer space which is fashioned as a disk-shaped churning space 5. The rotor 6 has an impeller type component 7 arranged closely adjacent to the strainer 8. Behind the stainer 8 is an accepts space 4 from which the cleaned fiber suspension is removed through the pipe socket 14. The ratio of the width $b_1$ of the churning space 5 to the diameter D of the casing section 1 is preferably between 0.1 and 0.3, and the higher value should never be exceeded. The rotor 6 has a shaft 18 supported in bore 19 and powered by a motor 21.

Churning space 5 is coupled to the strainer space 12 of the second casing section 2 which is formed between a drum type extension 9 of rotor 6 and a cylindrical strainer basket 11. The drum 9 supports sorting elements 16 in the form of blades 1 or wings with contours extending only a slight radial distance from the strainer basket 11. The sorting elements 16 preferably move feed components toward the outlet end 17 of the strainer space to eject the rejects. The accepts, which have passed through the perforations of the strainer basket 11, are removed through the pipe socket 20.

To increase the despeckling effect in the casing 1, slats, for instance in the form of welding beads, may be customarily provided on the strainer 8, on the far side from the impeller 7. An additional despeckling effect can be achieved through stator elements 15 which are arranged in annular fashion around the impeller.

In order to achieve a backup effect in the transition from the churning space 5 to the strainer space 12, a worm feed 28 is provided on the drum section 9 with a feed effect toward the strainer 8. This provides sufficient time for despeckling the fiber bundles or for breaking up the paper shreds.

The perforation holes of stainer 8 are preferably between 1.0 and 3.0 mm diameter, and the perforations of the strainer basket 11 at 0.6 to 1.5 mm diameter. If slots are provided, the slots in strainer 8 are preferably between 0.2 to 0.8 mm and between 0.15 to 0.8 mm for the strainer basket 11. The drum type section 9, generally extending from the front wall of the casing section 1 to the impeller 7, may be designed to have a decreasing diameter. This taper provides an increase in the radial pressure difference. The radial pressure difference causes the feeding or transfer of the suspension from the churning space 5 into the strainer space 12.

Preferably light contaminants accumulate in the center, that is, near the drum type section 9, but are separated directly in casing section 2. This a a major advantage as the light contaminants are quickly expelled from churning space 5, and as they are not comminuted they do not hinder the sorting operation.

This sorting apparatus only requires a single drive, whereas prior systems had to be equipped with several sorting apparatus each of which required its own drive. Wash water is passed through the lines and, as indicated by the dash-dot arrow in FIG. 1, to the strainer space 12 so that rejects can be continuously separated and removed from the fiber portion which provides a continuous operation.

A simple control of the transition of the suspension from the churning space 5 to the strainer space 12 is provided by controlling the speed of rotation of the rotor, which affects the radial pressure gradient. The pressure gradient may amount to 5-[m water head, as an example, but in the vicinity of the drum type section 9 a pressure of only 1 to 2 m water head may exist when the suspension is introduced at a pressure of approximately 1 bar at intake 3 in casing 1. The suspension is tangentially fed to the circumference of casing section 1. The transitional pressure gradient can be influenced by the suspension feed pressure.

Rotor shaft 18 is preferably vertically arranged. The backup at discharge end 17 of drum section 9 would then favorably influence the sorting effect or rejects separation, and a high dry content of the discharged rejects can be achieved.

Figure 2:
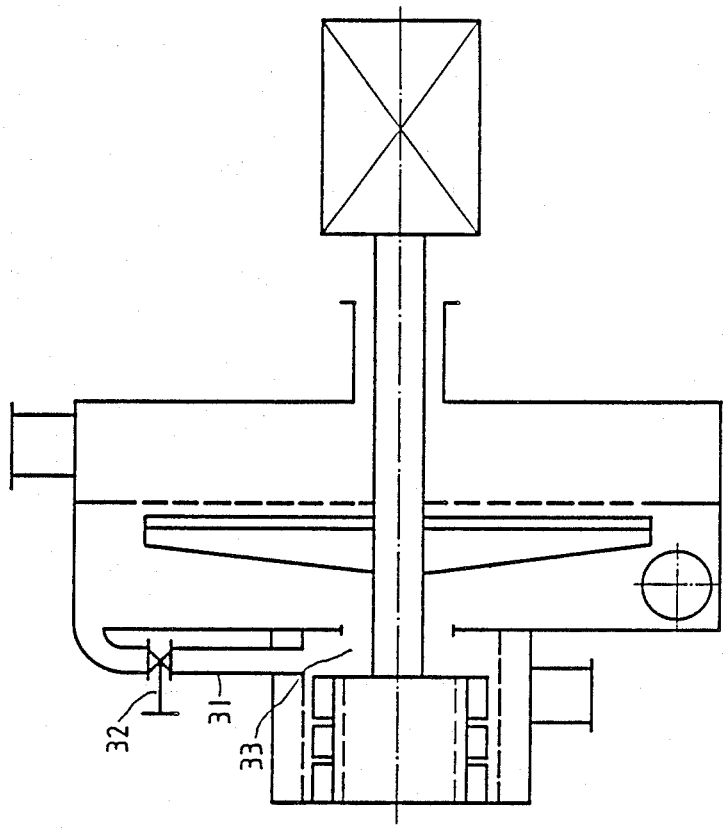
FIG. 2 illustrates a rejects transfer arrangement in the larger diameter casing section.

The suspension components with a high specific gravity, specifically heavy contaminants, tend to accumulate on the periphery of casing section 1. A return line 31 with a valve 32, as shown in FIG. 2, can be periodically opened to return these dirt portions to casing section 2. Line 31 empties into casing section 2 behind a diaphragm 33, which separates the churning space 5 from the casing section 2. The heavy contaminants can then be continuously separated which is a major advantage. Prior locks always required a more elaborate design and thus a greater expense, as well as requiring additional diluting water for cleaning the lock.

Figure 3:
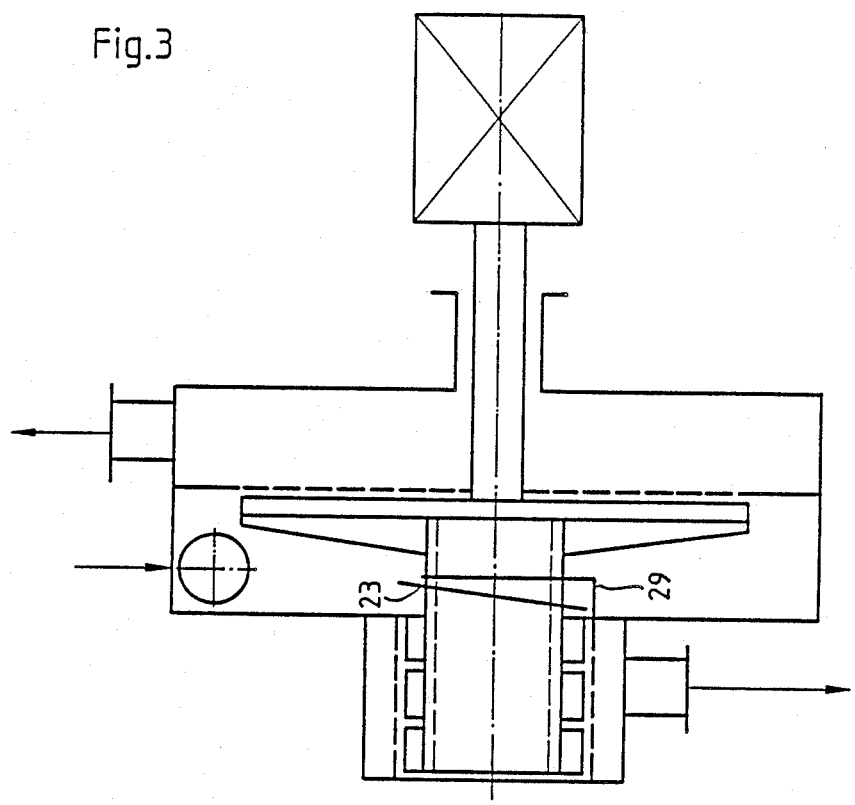
FIG. 3 illustrates a mechanical control arrangement.
Figure 3A:
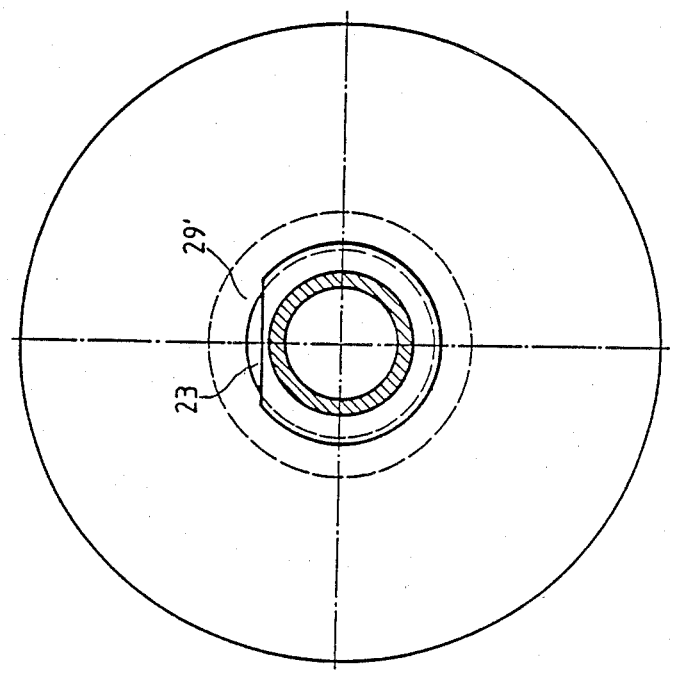
FIG. 3(a) is a longitudinal sectional view of the sorter and control arrangement of FIG. 3.

In the embodiment according to FIG. 3 and 3a, a swash plate 23 rotates in an added small casing 29 attached to drum section 9. Swash plate 23 causes a backup or damming effect as it transfers the suspension at a dosed feed effect from churning space 5 into strainer space 12. Added casing 29 is essentially a cylinder, which in its upper area is truncated at 29'. An adjustable-tilt swash plate 23 can be provided to accomplish a regulation or adaption of the backup effect based on the conditions in churning space 5 and strainer space 12.

Figure 4:
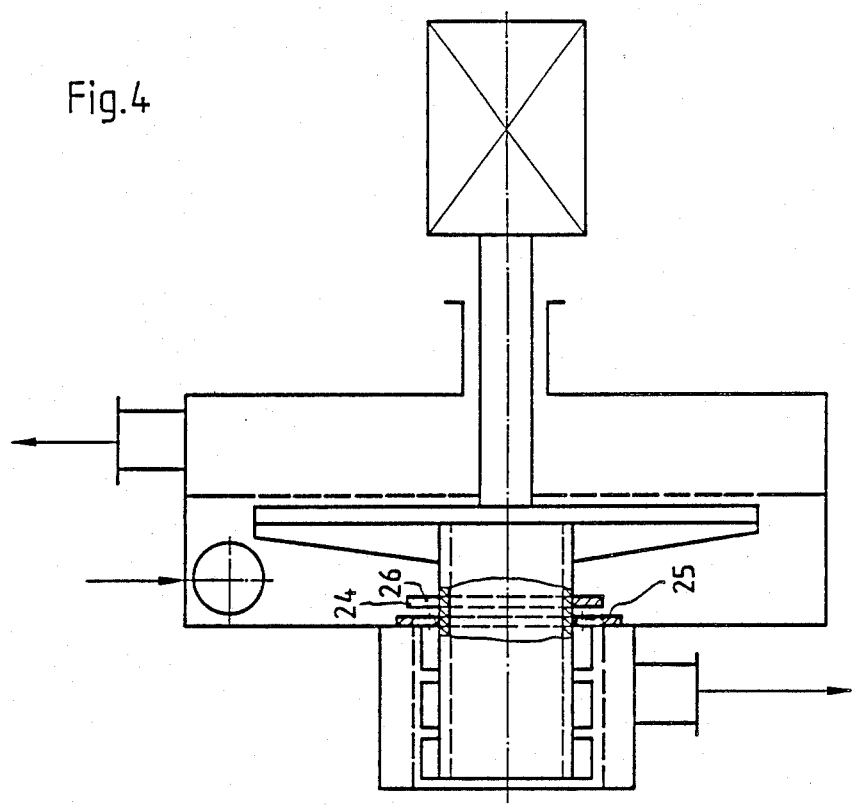
FIG. 4 is an alternative mechanical control arrangement.
Figure 4A:
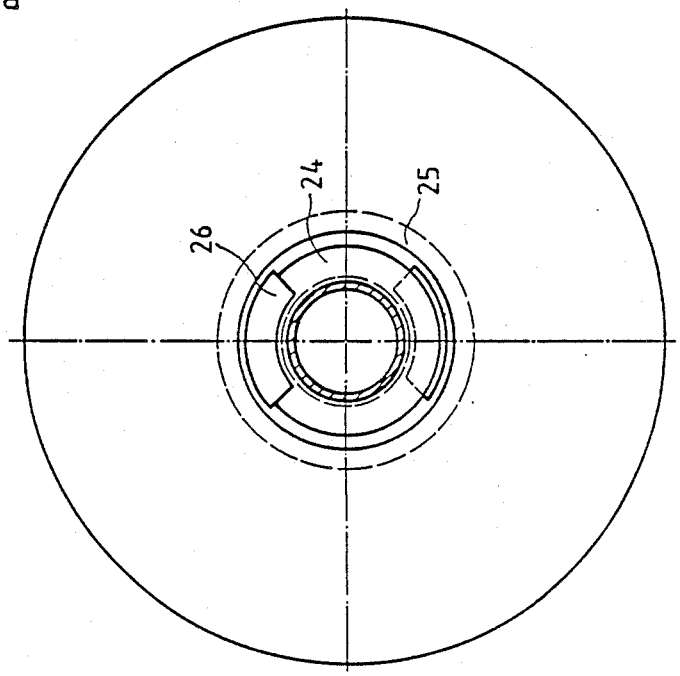
FIG. 4(a) is a longitudinal sectional view of the sorter and control arrangement of FIG. 4.

As shown in FIG. 4 and 4a, a further embodiment has a rotating disk arrangement utilizing a fixed disk 25 and a rotating disk 24 with an appropriate cutout 26, which ensures a controlled changeover of the suspension.

The described sorting apparatus may be both the first coarse sorter stage for low daily production rates and, also, a later coarse sorting stage for higher daily production rates. In the second case, the sorter would be arranged in a side circuit.

The sorting apparatus is not limited to coarse sorting operations; the machine may also be used for medium fine sorting purposes. Fine sorting, naturally, takes place with strained slots in the range of the initially cited minimum size values.

Figure 5:
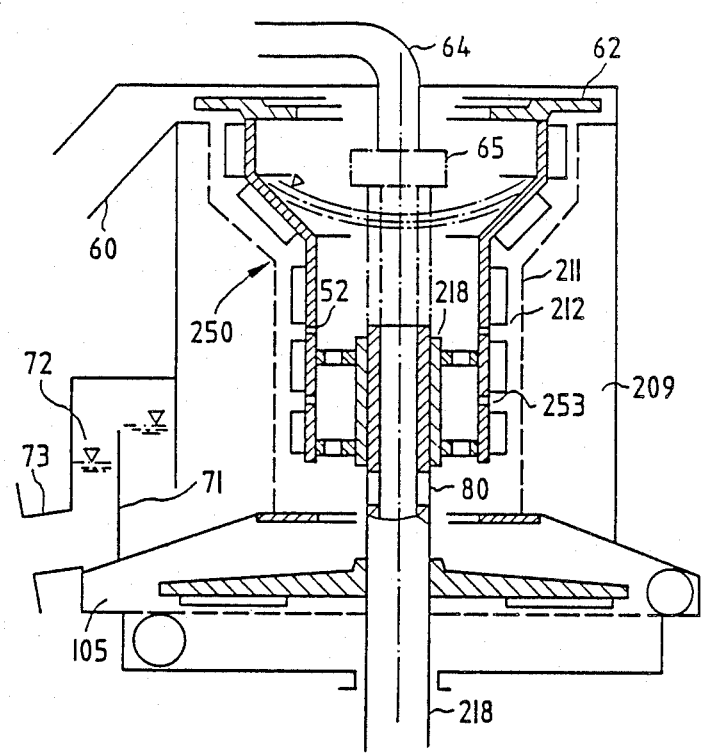
FIG. 5 illustrates an alternative embodiment of the sorter apparatus.

Figure 5 illustrates a variant of the final stage sorter, where the rotor 250 in the area of the second strainer 211 is hollow and has a circumferential wall 253 which is provided with water spray holes 52 for introducing diluting water into the second strainer space 212. Rotor shaft 218 is hollow and includes openings 80, so that further diluting water can be introduced in the transitional area between the first strainer space 105 and the second strainer space 212 through openings 80. The spray water is provided through a line 64 from a source not shown.

As indicated by dash-dot line FIG. 5, the spray water may also be fed under pressure, by means of a spray water head 65, as described in German Patent Publication No. 30 06 482 (corresponding to U.S. Pat. No. 4,356,085).

Moreover, second strainer 211 in FIG. 5 is enlarged or flared in diameter in its upper area, relative to its lower area, as is the respective rotor section, so that the sorting elements 16 in the flared diameter rotate on a greater diameter at a higher peripheral speed as compared to the lower area sorting elements, thereby exerting a better dehydrating effect on the rejects cake. A centrifugal disk 62 discharges the rejects cake into rejects channel 60.

A backup wall 71 behind second strainer 211 is coordinated with the accepts space 209 to pass the accepts into an accepts removal chamber 72 for removal through a withdrawal line 73.

Figure 6:
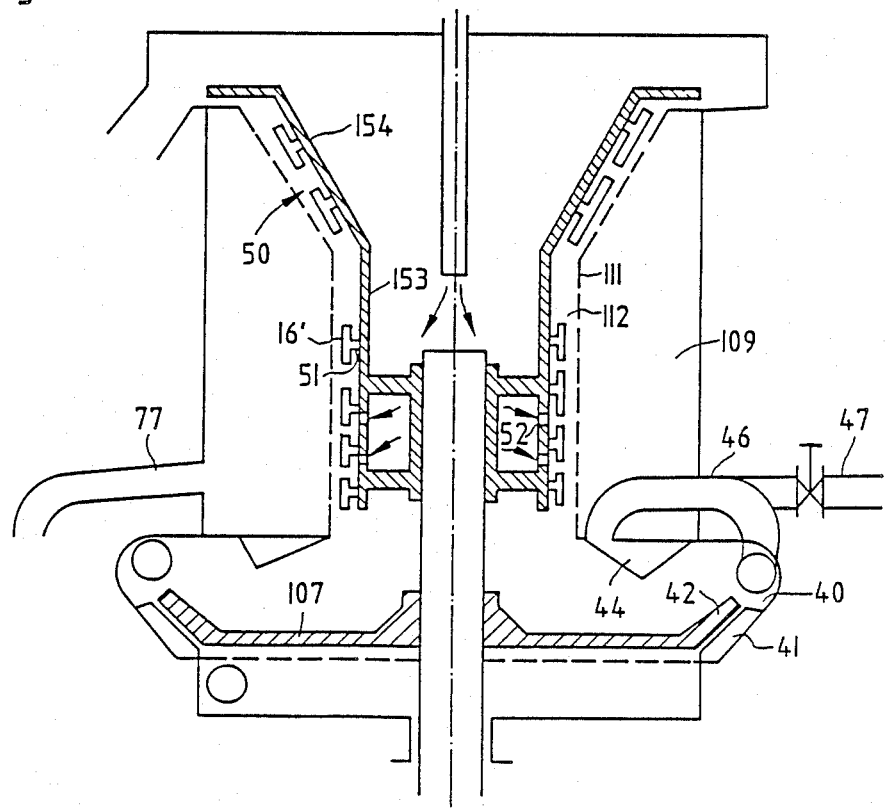
FIG. 6 is another embodiment of the sorter apparatus.

In the embodiment according to FIG. 6, the enlarged diameter of rotor section 50 and the second strainer space 112 have a conical design at the upper part 154 of the rotor section 50. The sorting elements are fashioned as hydrofoils 16' held by spacers 51 on the peripheral wall 153 of the drum. Spray water holes 52 are, in this case, preferably located directly in the area of hydrofoils 16', and are preferably provided in the direction of rotation behind spacers 51. Clogging of these spray water holes in thereby avoided when the spray water feeding is not under pressure.

The rotor 107 of first strainer space 205 features radially outwardly despeckling elements 42 interacting with fixed despeckling elements 41 which are preferably fashioned as ribs. As in FIG. 1 and the preceding figures, rotor 107 is fashioned as an impeller with individual radial or cycloidally shaped arms.

Ribs 44 now ensure a circulation of the suspension in the created despeckling zone 40. To avoid excessive thickening, recirculation of the fiber suspension is provided through a line 46, which may be connected to a water supply line 47. This arrangement provides an extensive despeckling effect.

The removal of the accepts from the accepts space 109 following the second strainer space 112 is carried out through the line 77.

Successive arrangement of the strainer spaces directly at the rotors and adjacent to them provides a very good fiber separation from the rejects and a high solid content of the rejects at the outlet of the sorting apparatus. The consistency of the fiber from the strainer is more than 10 or 20%, and the residual fiber content in the rejects is very low.

Those skilled in the art will recognize that certain variations can be made in the illustrated embodiments. While only specific embodiments of the invention have been described and shown, it is apparent that various alterations and modifications can be made therein. It is, therefore, the intention of the appended claim to cover all such modifications and alternatives which may fall within the true scope and spirit of the invention.

We claim:

1. A final stage sorter of a sorting apparatus for sorting a heavily contaminated rejects fraction from waste paper fiber suspension, said final stage sorter comprising:

a substantially rotationally symmetric casing having a first rotationally symmetric casing section and a second rotationally symmetric casing section communicating with one another, said second casing section having an open end opposite said first casing section, the diameter of said first casing section being larger than the diameter of said second casing section, said first and second casing sections having a common axis of rotational symmetry;

a flat strainer mounted in said first casing section substantially perpendicular to said axis, said flat strainer together with said first casing section defining a first accepts space and a churning space within said first casing section, said first casing section having inlet means for communicating said fiber suspension to the churning space;

a strainer basket mounted concentrically within said second casing section, said strainer basket together with said second casing section defining a sorting space and a second accepts space, the sorting space of said second casing section being adjacent to and in communication with the churning space of said first casing section; and a rotor mounted in said casing and rotatable about said axis, said rotor including an impeller disposed in said first casing section and rotatable in said churning space in proximity to said flat strainer, said rotor including a cylindrical component having circumferentially disposed sorting elements disposed in said second casing section and rotatable in proximity to said strainer basket.

2. A final stage sorter according to claim 1, wherein the churning space of said first casing section is disk-shaped with a width and a diameter, and a ratio of said width to said diameter between about 0.1 and 0.3.

3. A final stage sorter as claimed in claim 1, wherein said rotor has an axis of rotation, which axis of rotation is vertically oriented; said small diameter casing section sorting space serially arranged above and communicating with the large diameter casing section churning space.

4. A final stage sorter as claimed in claim 1, wherein said rotor has a hollow rotor shaft; said small diameter casing section defining a first end in proximity to said large diameter casing section churning space, said hollow rotor shaft operable to communicate diluting water to said first end.

5. A final stage sorter as claimed in claim 1, wherein said small diameter casing section defines a second end, which second end is operable to discharge the rejects fraction; and, said strainer basket is tapered to a larger diameter at said second end.

6. A final stage sorter as claimed in claim 3, wherein said rotor has a hollow rotor shaft; said small diameter casing section defining a first end in proximity to said large diameter casing section churning space, said hollow rotor shaft operable to communicate diluting water to said first end.

7. A final stage sorter as claimed in claim 3, wherein said sorting elements in said smaller casing section are hydrofoils.

8. A final stage sorter as claimed in claim 3, further comprising said first casing section has a first strainer space with a peripheral area radially outside the flat strainer; said peripheral area defining a despeckling zone; and, despeckling elements mounted in said despeckling zone.

9. A final stage sorter as claimed in claim 8, further comprising deflector ribs; said first casing section having a wall; and said deflector ribs arranged on said wall opposite said first casing section strainer, said ribs operable to deflect the flow of the suspension fraction circulating in said despeckling zone toward said first casing section strainer.

10. A final stage sorter as claimed in claim 6, wherein said small diameter casing section defines a second end, which second end is operable to discharge the rejects fraction; and, said strainer basket is tapered to a larger diameter at said second end.

11. A final stage sorter as claimed in claim 6, further comprising a mechanical control arranged at the transition from said first casing section to said second casing section.

12. A final stage sorter as claimed in claim 1, wherein said larger casing section strainer has a diameter (D), and said smaller casing section strainer has a diameter (d), which larger casing strainer diameter and smaller casing strainer diameter have a ratio (D/d) between about 1.5 to 4.

13. A final stage sorter as claimed in claim 1, further comprising said first casing section has a first strainer space with a peripheral area radially outside the flat strainer; said peripheral area defining a despeckling zone; and, despeckling elements mounted in said despeckling zone.

14. A final stage sorter as claimed in claim 13, further comprising deflector ribs; said first casing section having a wall; and said deflector ribs arranged on said wall opposite said first casing section strainer, said ribs operable to deflect the flow of the suspension fraction circulating in said despeckling zone toward said first casing section strainer.

15. A final sorter as claimed in claim 14, further comprising a circulation line communicating between said despeckling zone and said wall radially inside said ribs and operable to communicate rejects between said despeckling zone and said wall.

16. A final stage sorter as claimed in claim 15, further comprising a water line connected to said circulation line and operable to communicate water to said circulation line and said first casing section.

17. A final stage sorter as claimed in claim 1, wherein said sorting elements in said smaller casing section strainer space are hydrofoils.

18. A final stage sorter as claimed in claim 17, further comprising spacer elements mounted on said rotor shaft, which spacers include water spray holes generally radially formed in the direction of rotation behind said spacer elements, wherein said hydrofoils are supported by said spacer elements.

19. A final stage sorter as claimed in claim 11, wherein said mechanical control is a diaphragm, which diaphragm controls the fiber suspension pressure drop from said first section to said second section.

20. A final stage sorter as claimed in claim 9, further comprising a circulation line communicating between said despeckling zone and said wall radially inside said ribs and operable to communicate rejects between said despeckling zone and said wall.

21. A final stage sorter as claimed in claim 20, further comprising a water line connected to said circulation line and operable to communicate water to said circulation line and said first casing section.

22. A final stage sorter as claimed in claim 7, further comprising spacer elements mounted on said rotor shaft, which spacers include water spray holes generally radially formed in the direction of rotation behind said spacer elements, wherein said hydrofoils are supported by said spacer elements.

23. A final stage sorter of a sorting apparatus for sorting a heavily contaminated rejects fraction from waste paper fiber suspension, said final stage sorter comprising:
   a substantially rotationally symmetric casing having a first rotationally symmetric casing section and a second rotationally symmetric casing section communicating with one another, said second casing section having an open end opposite said first casing section, the diameter of said first casing section being larger than the diameter of said second casing section, said first and second casing sections having a common axis of rotational symmetry;
   a flat strainer mounted in said first casing section substantially perpendicular to said axis, said flat strainer together with said first casing section defining a first accepts space and a churning space within said first casing section, said first casing section having inlet means for communicating said fiber suspension to the churning space;
   a strainer basket mounted concentrically within said second casing section, said strainer basket together with said second casing section defining a sorting space and a second accepts space, the sorting space of said second casing section being adjacent to and in communication with the churning space of said first casing section;
   a rotor mounted in said casing and rotatable about said axis, said rotor including an impeller disposed in said first casing section and rotatable in said churning space in proximity to said flat strainer, said rotor including a cylindrical component having circumferentially disposed sorting elements disposed in said second casing section and rotatable in proximity to said strainer basket;
   mechanical control means for controlling flow of said fiber suspension from said first casing section to said second casing section.

24. A final stage sorter as claimed in claim 23, wherein said mechanical control means is a swash plate.

25. A final stage sorter as claimed in claim 23, wherein said mechanical control means is a diaphragm, which diaphragm controls the fiber suspension pressure drop from said first section to said second section.

26. A final stage sorter as claimed in claim 25, wherein said diaphragm is adjustable.

27. A final stage sorter as claimed in claim 23, wherein said mechanical control means is an assembly which assembly has a rotating disk and a fixed perforated disk each with openings which cooperate with each other.

28. A final stage sorter of a sorting apparatus for sorting a heavily contaminated rejects fraction from waste paper fiber suspension, said final stage sorter comprising:
   a substantially rotationally symmetric casing having a first rotationally symmetric casing section and a second rotationally symmetric casing section communicating with one another, said second casing section having an open end opposite said first casing section, the diameter of said first casing section being larger than the diameter of said second casing section, said first and second casing sections having a common axis of rotational symmetry;
   a flat strainer mounted in said first casing section substantially perpendicular to said axis, said flat strainer together with said first casing section defining a first accepts space and a churning space within said first casing section, said first casing section having inlet means for communicating said fiber suspension to the churning space;
   a strainer basket mounted concentrically within said second casing section, said strainer basket together with said second casing section defining a sorting space and a second accepts space, the sorting space of said second casing section being adjacent to and in communication with the churning space of said first casing section;
   a rotor mounted in said casing and rotatable about said axis, said rotor including an impeller disposed in said first casing section and rotatable in said churning space in proximity to said flat strainer, said rotor including a cylindrical component having circumferentially disposed sorting elements disposed in said second casing section and rotatable in proximity to said strainer basket; and
   mechanical control means for controlling flow of said fiber suspension from said first casing section to said second casing section, said mechanical control means being a worm feed.

* * * * *